May 9, 1950

O. C. ROWE 2,506,894

EDUCATIONAL CONTRIVANCE

Filed May 18, 1948

Orlo C. Rowe
INVENTOR.

BY *Thomas A. O'Brien*
*and Harvey B. Jackson*
Attorneys

Patented May 9, 1950

2,506,894

UNITED STATES PATENT OFFICE 2,506,894

EDUCATIONAL CONTRIVANCE

Orlo C. Rowe, Boonville, Mo.

Application May 18, 1948, Serial No. 27,801

3 Claims. (Cl. 35—21)

This invention relates to a novel and simple mechanical device or instrumentality which is especially, but not necessarily, adapted for use by insurance companies, particularly salesmen, in teaching uninformed prospects the two purposes and rudimentary values of various provisions of life and accident insurance contracts.

The principal object of the invention is to provide a readily understandable contrivance which is so constructed that the observer may be shown, by variable and visual examples, how he may best gage his livelihood and mode of living to cope with ever-changing contingencies of life, whereby to plan his life and budget his resources in a manner to meet the never ending requirements of a satisfactory existence.

Another object of the invention is to bring into use an ingenious mechanical demonstrator which is indicative of human events and essential resources wherein intermeshing cog-wheels, carrying appropriate legends and messages, symbolize life in and out of gear, so to speak, and which may be caused to turn in unison; or, may be caused to slip and operate haphazardly, thus proving the theory that life may be disrupted, when things go wrong, or readjusted and balanced in operation when it is properly geared to attain wanted goals.

Another object of this invention is to provide a simple and economical reckoning and planning device which utilizes a base carrying two, or more, meshing gears or cog-wheels, one of which symbolizes, let us say, a wheel of destiny, and the other, a wheel of life or living, the latter displaying ordinary goals of life, and the former depicting the resources and ways and means through the medium of which said "goals" may be realized or reduced to actual practice.

A further objective has to do with the stated structure through the instrumentality of which one may be acquainted with first principles and fundamental ideas of how, under adverse circumstances, predetermined methods (in life or in business) may be established and employed to meet the needs and requirements of the proverbial rainy day.

A still further objective of my invention is to utilize cog-wheels whose cogs, which carry the explanatory inscriptions, are selectively attachable and detachable so that by removing a cog from the driving wheel of destiny (the one to the left in the drawings) the driven wheel of life will then turn with a hitch, only to convincingly reveal that living thereafter will be irregular until the missing cog, or a good substitute, is replaced on the first wheel thus restoring the balance and constant drive needed.

Other objects, features and advantages will become more readily apparent from the following description and the accompanying illustrative drawings.

In the sheet of drawings, wherein like numerals are employed to designate like parts throughout the views.

Briefly, and specifically, a preferred embodiment, comprises two or more cog-wheels with any number of removable teeth attached to and forming parts of each wheel, the wheels and teeth to be constructed from any suitable material and the teeth attached to each wheel in any satisfactory manner so that they may be removed and replaced. The wheels and teeth are mounted so that the teeth mesh, one wheel turning another (or other wheels) and being so constructed that the wheels do not properly operate if one (or more) teeth of a wheel be removed.

As above stated, the contrivance is to be used to demonstrate and/or sell any intangible; to illustrate the connection of business management with other branches of a business and to show the necessity of cooperation between the various departments. The device is also particularly adapted to the sale of accident insurance, life insurance and securities.

Figure 1:
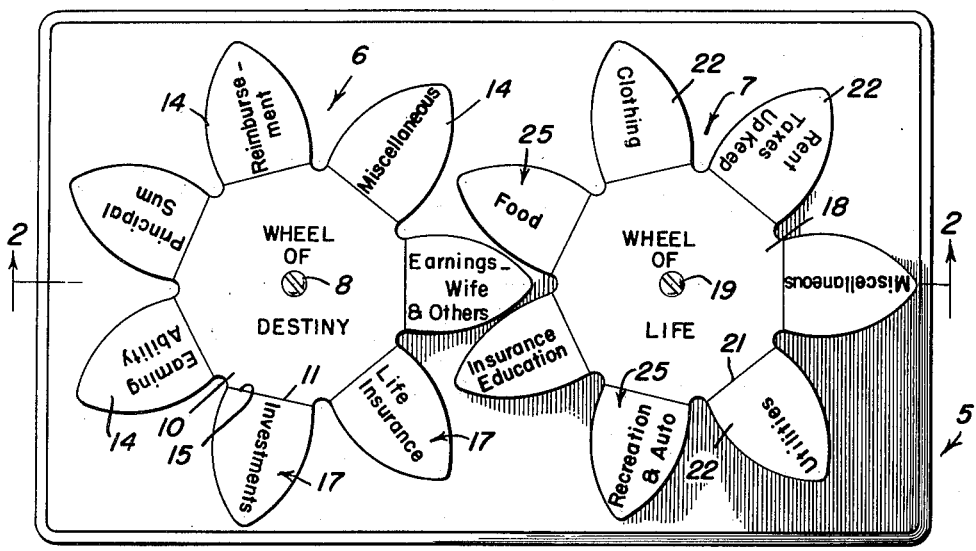
Figure 1 is a top plan view of a device or contrivance constructed in accordance with the principles of the instant invention.
Figure 2:
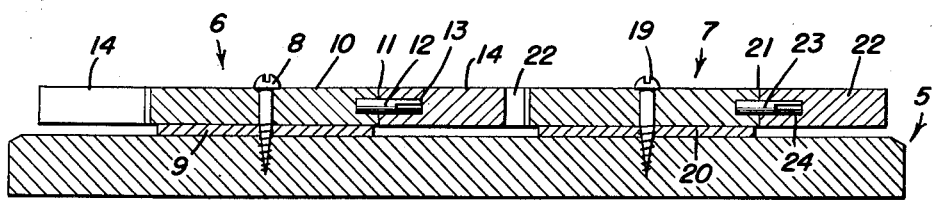
Figure 2 is a central longitudinal sectional view on the line 2—2 of Figure 1, looking in the direction of the arrows.
Figure 3:
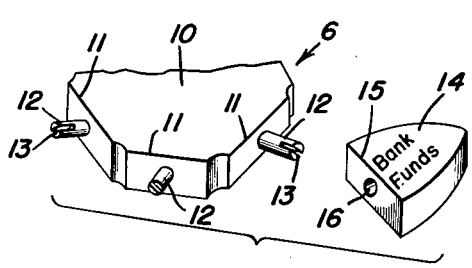
Figure 3 is a fragmentary perspective view showing a portion of one of the cog-wheels with all but one of the cogs omitted, the latter being shown detached; and, Figure 4 is a detail view showing top and bottom faces of one of the teeth or cogs of the "wheel of destiny."
Figure 4:
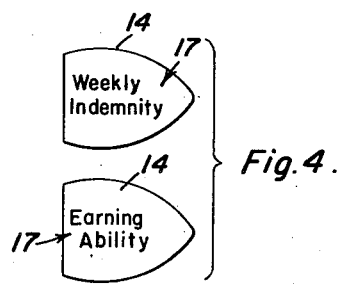

Referring now to the drawings by distinguishing reference numerals and lead lines, it will be seen that the base is denoted by the numeral 5, and this may be of suitably colored plastic material, wood, or the like. It is preferably of rectangular form and is of a size to be conveniently carried in a brief case or the like. Except for the printed subject matter carried thereby, the two cog-wheels are identical in construction. The one to the left, denoted by the numeral 6, although it may carry some other title or designation, may be conveniently referred to as the "wheel of destiny." The cog-wheel to the right is denoted by the numeral 7 and carries the designation "wheel of life." The wheel 6 is rotatably anchored, as at 8, on the base and is spaced above the top surface of the base by a washer or the like 9. It comprises a hub 10 whose peripheral or marginal portions are fashioned into circumferentially spaced shoulders or abutments 11. Each abutment carries an outstanding dowel pin or stud 12, the outer end of which is formed with a slot or kerf 13 to provide grips to frictionally retain an associated cog or tooth 14. The inner end of the tooth is flattened and straight across, as at 15, to rest firmly against the complemental abutment or shoulder and is provided with a central socket 16 for reception of the assembling and retaining dowel 12. The top surfaces of the cogs carry descriptive notations 17 such as "life insurance," "investments" and so on and so forth. This being the "wheel of destiny" the inscriptions are in keeping with ideas having to do with employment, ways and means of earning money and resources. Other inscriptions, Figure 4, are on the underneath or bottom sides of the cogs, and these inscriptions also have to do with the "wherewithal" category. It follows, therefore, that wheel 6, thus constructed, represents or symbolizes the ways and means whereby the stated "wherewithal" may be earned, saved and otherwise properly handled to take care of the expenses necessary to operate and run the wheel of life 7. Incidentally, the "wheel of life" is a duplicate, structurally, of the wheel 6 and embodies a hub 18 rotatably mounted as at 19, spaced above the board as at 20 in Figure 2, said hub having shoulders around the outer margin or perimeter at 21 to accommodate the shouldered inner ends of the cogs or teeth 22. Here again I use dowels or studs 23 having their outer ends split and fashioned into prongs as at 24 to frictionally hold the socketed ends of the teeth properly in place and to facilitate the steps of attaching and detaching the teeth. It will be noted that the teeth 22 carry inscriptions or legends 25 such as represent essentials and necessities, for instance, food, clothing, rent, taxes and so on. The bottom sides of the teeth 25 are provided with similar legends or inscriptions in the category now under advisement.

I also desire to point out, at this stage, that the wheel 6 is the motivating or drive wheel and the wheel 7 is the complemental or driven wheel, and these expressions may be interpreted in a figurative as well as a mechanical sense. As a matter of fact, since the wheels are intended to illustrate and demonstrate the trials and tribulations of life in and out of gear, it will be obvious why I employ gears or cog-wheels to informatively symbolize principles of mechanics in relation to principles and modes of living a properly balanced and effectively "geared" life.

Although the invention shown and described appertains to a novel accessory which may be used in actual practice by insurance agents and salesmen, it is evident that the construction is such that, by changing the various printed inscriptions, other problems may be systematically posed and reasonably well solved. For instance, the device may be employed as an educational game with the inscriptions shown to enable parents to teach children comparative values and to thus acquaint them with problems having to do with expectancies, anxieties and plain truths. It is because of such accomplishments that I have referred to the device, in a broad sense, as an educational contrivance.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. An experimental problem and answer indicator device of the type shown and described comprising a portable base, and intermeshing cog-wheels mounted for rotation on said base, one cog-wheel carrying legends descriptive of the necessities and aims of an individual, and the other cog-wheel carrying complemental legends indicative of the ways, means and resources required to attain the ends of the aims displayed on said first named cog-wheel, said legends appearing only on the cogs of said wheels and said cogs being selectively attachable and detachable, whereby to interrupt the relative speed of rotation of said wheels, or, to throw said wheels completely out of gear, as required, for demonstration purposes.

2. In a structure of the class described, a base, a hub spaced above and mounted for rotation on said base, the outer perimeter of said hub being provided with circumferentially spaced abutments and said abutments being provided with radially projecting studs, and a plurality of attachable and detachable teeth, said teeth being rectangular in cross-section and the inner ends of said teeth being adapted to firmly contact said abutments and being provided with sockets for reception of said studs, said teeth constituting changeable exhibitors and the top and bottom surfaces thereof being provided with printed inscriptions for planning, demonstrating, and educational purposes.

3. A visual-type facts demonstrating educational device of the kind herein shown and described and wherein factors involved in a well known principle of mechanical gear operation may be used as a translatable basis on which to predicate corresponding factors which may be said to be involved in the principles of living and the goals of a human being, comprising a base, a pair of complemental intermeshing gear wheels mounted for free rotation on said base, one gear-wheel being adapted to be rotated back and forth by the hand of a demonstrator who is capable of revealing and explaining broadly the principles of gear propulsion, and then translating and comparing the theories of continuous and interrupted results into analogous theories associable with principles of living, said one gear wheel constituting a driver and symbolizing modes of making a living and carrying legends indicative of resourceful ways and means to make a living, the remaining gear wheel constituting the driven element and symbolizing recognized modes of living and carrying legends which are descriptive of the daily needs and aims of an individual, said gears having readily attachable and detachable intermeshing teeth, said legends being confined to and being on top and bottom surfaces of the respective teeth and being systematically categorized and appropriate for the respective gears, whereby the demonstrator may detach teeth, replace same or substitute other teeth for those detached at will so as to enable him to carry out his demonstration of orientation and re-orientation.

ORLO C. ROWE.

REFERENCES CITED

The following references are of record in the file of this patent:

UNITED STATES PATENTS

| Number | Name | Date |
| --- | --- | --- |
| 376,522 | Gray et al. | Jan. 17, 1888 |
| 1,327,107 | Lingle | Jan. 6, 1920 |
| 1,634,194 | Jacobs | June 28, 1927 |
| 1,948,712 | Hornung | Feb. 27, 1934 |
| 2,088,128 | Benjamin | July 27, 1937 |